United States Patent
Crook, Jr.

[15] 3,674,301
[45] July 4, 1972

[54] HOOK AND COLLAR WITH GATE
[72] Inventor: Edward J. Crook, Jr., Fort Wayne, Ind.
[73] Assignee: America Hoist & Derrick Company, St. Paul, Minn.
[22] Filed: Jan. 7, 1971
[21] Appl. No.: 104,611

[52] U.S. Cl. ..................................................... 294/82
[51] Int. Cl. ........................................................ B66c 1/36
[58] Field of Search.............. 294/82, 83; 24/241 PS, 241 PL, 24/241 SB

[56] References Cited

UNITED STATES PATENTS

| 3,121,274 | 2/1964 | Evans | 294/82 R |
| 2,728,967 | 1/1956 | Burnham | 24/241 PL |
| 3,545,051 | 12/1970 | Kennard | 24/241 PS |

Primary Examiner—Evon C. Blunk
Assistant Examiner—I. Kenneth Silverman
Attorney—Burd, Braddock & Bartz

[57] ABSTRACT

A load handling hook has a cylindrical shank and an integral hook body portion. This body portion includes an integral outward projection and an integral shoulder adjacent the shank. A collar is supported on the shoulder and around the shank and includes fingers which extend over the projection to prevent rotation of the collar. A safety gate includes a hub rotatably mounted around the shank and on the collar and also includes a bridging arm integral with the hub and situated to be rotatable with the hub between bridging and clearing relation with the throat of the hook. An outward extension of the hub provides a housing for a locking plunger which is spring biased to slide through an opening in the hub and into an opening in the collar to affix the hub in latching, rotation preventing relationship to the collar when the arm is in bridging relationship to the hook throat. The plunger is manually slidable against the spring action to unlatched relationship with the collar to allow rotation of the hub and arm.

8 Claims, 6 Drawing Figures

PATENTED JUL 4 1972 3,674,301

INVENTOR.
EDWARD J. CROOK JR.
BY
Burd Braddock & Bartz
ATTORNEYS

HOOK AND COLLAR WITH GATE

BACKGROUND OF THE INVENTION

Load handling hooks for cranes and hoists and the like are often equipped with gates and latches for preventing the accidental release of a load carrying rope, cable or chain from the hook. For example see U.S. Pat. No. 3,430,307. Customarily such gates can move from clearing position across the throat of the hook into bridging relation with respect thereto, and locking pins can be employed to cooperate with holes, slots, or flats on the shank of the hook to lock the gate in closed position. See U.S. Pat. Nos. 2,728,967; 2,853,760; and 2,791,817. Such discontinuities on the shank or other parts of the hook give rise to points of stress concentration under load conditions, thus appreciably reducing the maximum load carrying capacity of the hook. Further, these discontinuities in the shank substantially shorten the fatigue life of the hook. These locking elements of the prior art have been employed in such latches in close proximity to the axis of the shaft of the hook, and are, therefore, subjected to a maximum of stress when a side force is applied to the gate and the locking pin must withstand this force to prevent the gate from rotating out of closing relationship to the hook throat.

SUMMARY OF THE INVENTION

A load carrying hook having an elongated shank of uniform cross sectional dimension and an integral downwardly extending hook body portion includes an integral outward projection situated in adjacent relationship to the juncture of the shank and body portion. A collar is supported around the shank and adjacent the body portion and is provided with at least one integral projecting finger which can be situated to relate to the outward projection of the hook in such a manner as to prevent rotation of the collar with respect to the hook. On the outer periphery of this collar, a latch opening is provided. A safety gate includes a hub rotatably mounted with respect to the hook and resting on the collar and includes an arm constituted as an integral outward extension of the hub. The arm is situated to be rotatable with the hub between bridging and clearing relation with the throat of the hook. An outward extension of the hub provides a housing for a latching assembly which includes a locking plunger and resilient means to urge the plunger through an opening provided in the hub and into the aforementioned collar opening when the safety gate arm is located in closing bridging relation to the hook throat. Manually operable means are provided for moving this locking plunger against the action of the spring and into clearing relation to the collar opening thus to permit rotation of the safety gate arm toward clearing relation with the hook throat.

A torsion spring can be provided between the interlocking collar and the hub of the safety gate to automatically move the arm into clearing or bridging relation to the throat hook should this prove desirable in certain installations.

By utilizing the interlocking collar with its latching opening spaced at a substantial distance from the outer surface of the hook shank, the stress on the locking plunger when extending through the hub opening into the collar opening is considerably less than would be exerted on a similar locking plunger operating on the shank itself upon the application of accidental or deliberate side loading of a given magnitude on a safety gate arm. Further, the use of interlocking collar to form the reaction point for the locking plunger eliminates the need for notches, holes, flats or the like on the hook shank. Thus points of undue stress concentration, which characterize the prior art, have been eliminated.

Should it be necessary or desirable to use a hook without the safety gate, or to replace or repair the elements of the interlocking collar and safety gate construction, the collar and gate are easily removed from the shank by simply sliding them off in the longitudinal direction once the shank has been disconnected from the usual load line (not shown).In the drawings.

DESCRIPTION OF THE PREFERRED EMBODIMENTS

Figure 1:
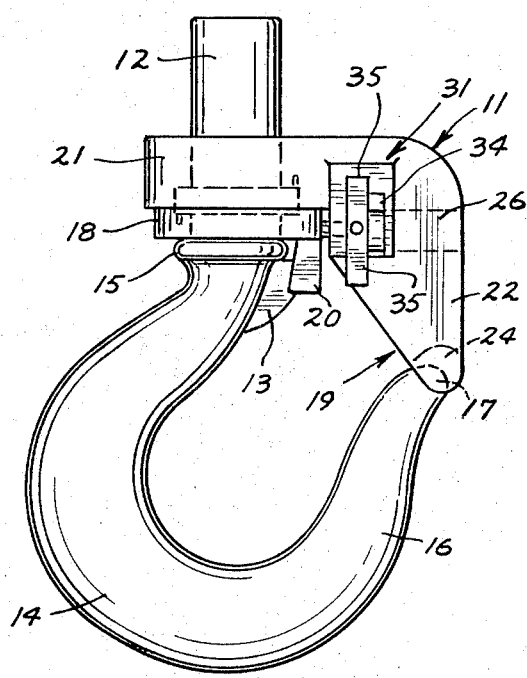
FIG. 1 is a side elevational view of a first embodiment of the invention.
Figure 2:
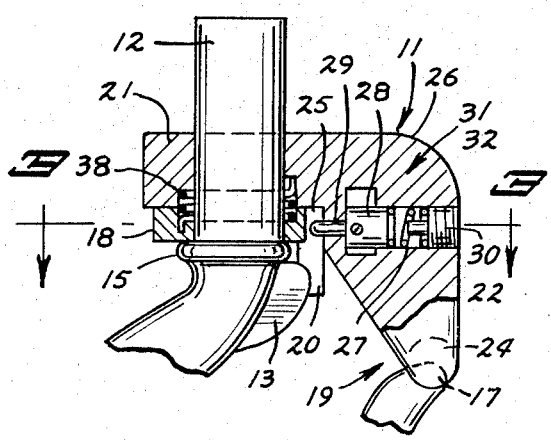
FIG. 2 is a fragmentary side elevational view of a portion of the hook, interlocking collar and gate of FIG. 1 with parts broken away.
Figure 3:
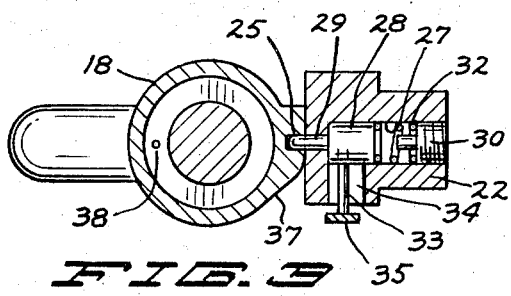
FIG. 3 is a sectional view taken along the line 3—3 in FIG. 2.

In a first embodiment of the invention as shown in FIGS. 1 through 3, a load handling hook can include a hook shank 12 of uniform cross sectional dimension (cylindrical as shown) extending integrally upwardly from a hook body portion 14. This body portion 14 is provided with a shoulder 15 immediately adjacent the shank 12. The body portion 14 curves downwardly away from the extension of the longitudinal axis of the shank 12 in a first direction, passes through a lower most point approximately in line with this imaginary extension of the hook shank axis, curves outwardly in an opposite direction to provide an outwardly curved portion 16 which terminates in an outwardly directed tip 17. The space between this tip 17 and the hook body portion adjacent the shank is designated as the throat 19.

As shown in the first three figures, an outward projection or extension 13 is constituted as an integral part of the hook body 14 adjacent the shoulder 15.

An interlocking collar 18 is provided with an opening therethrough to slidably receive the shank 12. This collar rests on the shoulder 15 of the hook body portion 14 and is provided with an integral, downwardly and outwardly extending pair of fingers 20,20 which, when the interlocking collar is in place around the shank 12 and on the shoulder 15, contact either side of the extension 13 thus to lock the collar against rotation with respect to the hook 10. The interlocking collar has a generally cylindrical outer wall 23, but this is interrupted by a latching opening 25 and by a camming ramp 37 which has a tangent relationship to the cylindrical wall 23 and extends radially outwardly toward the latching opening 25. As best seen in FIG. 3, this collar latching opening 25 is situated between integral upward extension of the fingers 20,20 and the camming ramp 37 includes the upper outer surface of one of those fingers.

A safety gate 11 includes a hub 21 rotatably mounted with respect to the shank 12; and includes a safety gate bridging arm 22 integral with that hub and extending outwardly and downwardly therefrom. In the outer end of this arm there is a recess 24 adapted to receive the hook tip 17 when the safety gate is situated to position the arm 22 in bridging closing relationship to the throat 19.

An enlarged extension portion 26 of the hub 21 of the safety gate provides a latching assembly housing 31. In the first embodiment of the invention, this housing is on the same side of the hub and partly includes part of the gate arm 22. A horizontal bore 27 is provided in the hub extension 26, the bore having an axis in radial alignment with the interlocking collar 18. When the safety arm 22 is in its closed position across the throat 19 of the hook, the axis of the bore 27 is in alignment with the latching opening 25 of the collar 18. A locking plunger 28 is slidably mounted on the bore 27 and compression coil spring 32 is situated between it and a closing plug 30 which is threadably mounted in the bore to the end that the spring 32 urges the locking plunger 28 in direction toward the shank 12. An end portion 29 of the plunger 28 is of size to substantially exactly fill the latching opening 25 in horizontal dimension when the safety gate arm 22 is in its closed position. Under the action of the spring 32, the plunger 28 will remain in locking relationship to the latching opening 25, and the end portion 29 of the locking plunger 28 will prevent rotation of the safety gate with respect to the interlocking collar 18. Since the collar 18 is locked with respect to the hook, the rotation of the safety gate with respect to the hook is prevented, and any load cable, rope or chain loop being carried by the hook cannot become accidentally discharged therefrom through the now closed and bridged throat 19.

The safety gate 11 is provided with a finger pin opening 34 in alignment with the central portion of the bore 27, and a plunger pin 33 extends outwardly from the plunger 28 to terminate in a finger piece 35. This finger piece can be moved in direction away from the shank to cause the end portion 29, along with the rest of the plunger, to move away from the shank 12, to the end that the plunger is in clearing relation to the interlocking collar 18 and the safety gate arm 22 can again be rotated with respect to the shank to bring it to clearing relation with respect to hook throat 19.

A recess in the bottom portion of the hub 21 and a recess in the upper portion of the interlocking collar 18 together provide a compartment for a torsion spring 38 which is pinned to the hub and the interlocking collar in such a manner that the safety gate will be urged to move in direction from closed toward open relationship to the hook throat 19 when not held in a closed position by the locking plunger 28. When the parts are in the open position, the end portion 29 of the locking plunger 28 will rest on the cylindrical outer surface 23 of the interlocking collar. When once again the safety gate is manually moved toward the closed position, this end portion 29 rides up camming ramp 37 until the outer end 29 of the plunger 28 will once again fall into the latching opening 25 of the interlocking collar thereto fixably position the safety gate with arm 22 in contact with hook tip 17.

It is to be understood that the torsion spring 32 could be biased to act in the opposite direction and to tend to keep the safety gate closed at all times except when manually held in open position to temporarily allow access to the hook thru the throat 19.

Figure 4:
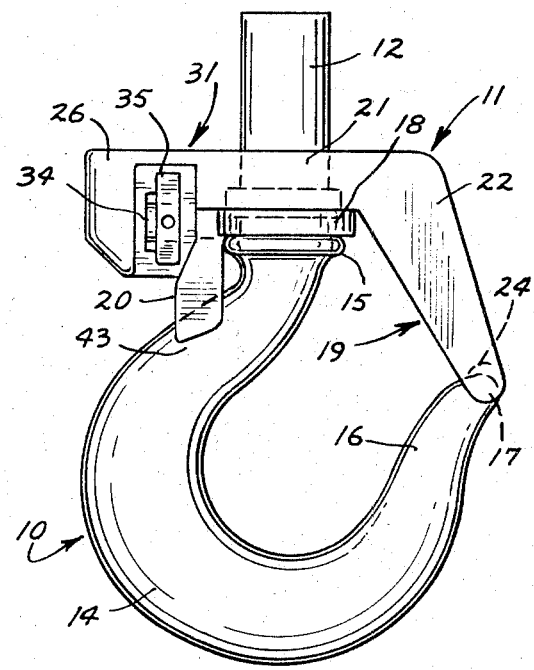
FIG. 4 is a side elevational view of a second embodiment of the invention.
Figure 5:
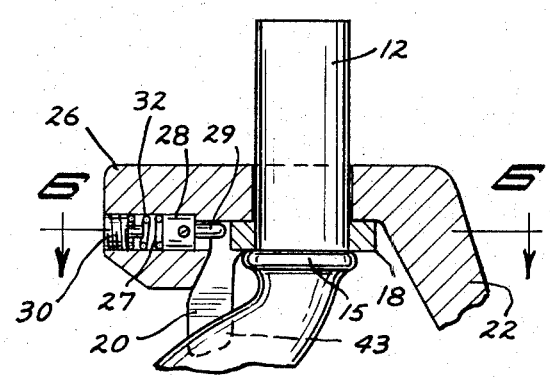
FIG. 5 is a fragmentary side elevational view of a portion of the hook, interlocking collar and gate of FIG. 4 with parts broken away.
Figure 6:
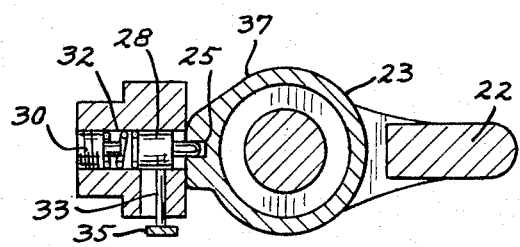
FIG. 6 is a sectional view taken along the line 6—6 in FIG. 5.

A second embodiment of the invention is shown in FIGS. 4, 5 and 6 in which the same reference numerals are used to identify parts which are identical or similar to the corresponding parts described in connection with the first embodiment of the invention. In this embodiment of the invention, the hook 10 consists of a similar or identical shank 12 and body portion 14, except that the forward extension 13 need not be present. Instead, the integral projection or extension 43 for contacting the interlocking collar fingers 20,20 is constituted as an upper part of the hook body portion 14 near the shank 12.

In the second embodiment of the invention, the latching assembly 31 is accommodated in an enlarged portion 26 of the hub 21 located on the side of the hub opposite the safety gate bridging arm 22. The downwardly and outwardly extending fingers 20,20 are of size and shape and position to come into collar holdin relationship on opposite sides of integral extension 43 of the hook body. Otherwise the interlocking collar 18 of the second form of the invention can be substantially identical with that of the first form of the invention; except that it will be installed in opposite direction so that the latching opening 25 therein will be in radial alignment with the shank 12 on the side of the hook opposite the throat 19.

As in the case of the first form of the invention, once the safety gate has been closed with gate arm 22 in contact with hook tip 17, sealing off and bridging hook throat 19, the compression spring 32 will hold the forward portion 29 of the plunger 28 in locking relationship to the latching opening 25 in the interlocking collar 18 and will prevent the safety gate from rotating until such time as the finger piece 35 is utilized to force the plunger 28 back against the spring to release the gate and allow it to be rotated to place the arm in clearing relation to the hook throat 19. It is to be noted that in this particular embodiment of the invention, the torsion spring has been eliminated, so that there will be no bias on the latching arm in either direction. This torsion spring can be utilized or omitted in either form of the invention.

It is to be noted further, that a latching assembly housing could be situated in an enlarged portion of the hub, not only on the hook arm side of the hub as shown in the first embodiment of the invention or on the opposite side of the hub as shown in the second embodiment of the invention, but at any location around the hub.

Further, it is to be noted that the shear forces on the plunger 28 and in the fingers 20,20 and the integral extensions of the hook body 13 and 43 are developed at substantially greater distances from the center of axis of rotation of the safety gate about the shank 12 than would be the case if the locking plunger acted directly on that shank. This means that smaller parts can be used to withstand the same forces which may accidentally or necessarily cause side loading on the safety gate arms 22. However, perhaps more important, is the fact that the necessity for providing a latching opening in the form of a hole, slot or flat on the shank itself has been eliminated. This eliminates the high stress concentrations which necessarily occur in the normal loading of the hook for its intended purpose when the shank has been so weakened.

The embodiments of the invention in which an exclusive property or privilege is claimed are defined as follows:

1. An improved hook with a gate, said hook of the type having a shank, a body portion, a tip spaced from the shank thereby providing a throat opening, and a gate selectively movable between an open position clear of said throat and a closed bridging position across said throat opening, wherein the improvement includes:
   an interlocking collar disposed about said shank having a latching opening on its perimeter;
   means restraining said collar from rotation around said shank;
   said gate including a hub rotatably mounted with respect to said collar and a throat bridging arm integral with said hub;
   said hub having an enlarged extension portion;
   a latching assembly accommodated in the enlarged extension portion of said hub;
   said latching assembly including a locking plunger slidably disposed in a bore in said enlarged portion of the hub, said bore being in alignment with said latching opening of the collar when the gate is in the closed, bridging position, said plunger being movable in said bore to engage and disengage said latching opening when the gate is in a closed position, and means for the manual manipulation of said plunger into and out of engagement with said slot;
   a compression spring disposed in said bore between the outer hub wall and the locking plunger to urge the locking plunger toward the interlocking collar;
   the perimeter of said collar also including a cylindrical portion and a ramping surface for slidably receiving the inner end of said plunger when said gate arm is not in latched condition; and
   said ramping surface being of configuration to move said plunger to position to engage said latching opening as said gate arm arrives at said closed position, 2. The hook with gate of claim 1 including: resilient means connected between said collar and said gate disposed to bias the gate toward movement in a first angular direction with respect to said collar.

3. The hook with gate of claim 2 wherein said resilient means includes a torsion spring.

4. The hook with gate of claim 1 wherein said hook has an integral extension and said interlocking collar includes: a pair of integral depending spaced apart fingers adapted to straddle said extension of the hook thereby preventing rotation of the collar on the shank.

5. The hook with gate of claim 4 wherein said hook extension comprises: an integral projection adjacent the throat opening and in alignment with the tip, and wherein said hub extension is contiguous to the throat bridging arm.

6. The hook with gate of claim 4 wherein said hook extension comprises: an outwardly curved portion of the hook body portion near the shank and on a side of the hook opposite the throat.

7. An improved hook with a gate, said hook of the type having a shank, a body portion, a tip spaced from the shank thereby providing a throat opening, at least one integral, outwardly projecting extension, and a gate selectively movable between an open position clear of said throat and a closed bridging position across said throat opening, wherein the improvement includes:

an interlocking collar slidably disposed about said shank;

said collar having a pair of integral depending spaced apart fingers adapted to straddle said extension of the hook thereby preventing rotation of the collar on the shank;

said gate including a hub slidably mounted on the shank and rotatably mounted with respect to said collar and a throat bridging arm integral with said hub;

said hub having an enlarged extension portion;

a latching assembly accommodated in the extension of said hub; and said latching assembly adapted to cooperate with said collar to releasably latch the gate in the closed position.

8. The hook with gate of claim 7 wherein said collar has on its perimeter a radially aligned latch opening and said latch assembly includes:

a locking plunger slidably disposed in a bore in said enlarged portion of the hub, said bore being in radial alignment relative to said collar and in alignment with said latching opening when the gate is in the closed, bridging position, said plunger being movable in said bore to engage and disengage said latching opening when the gate is in a closed position, and means for the manual manipulation of said plunger into and out of engagement with said slot.

* * * * *